United States Patent Office 3,062,748
Patented Nov. 6, 1962

3,062,748
INHIBITED AQUEOUS ACIDIC COMPOSITION
Hugh T. Harrison, Tulsa, Okla., assignor to The Dow Chemical Company, Midland, Mich., a corporation of Delaware
No Drawing. Filed Aug. 24, 1959, Ser. No. 835,449
9 Claims. (Cl. 252—147)

The invention relates to the preparation and use of an aqueous acidic composition containing HCl having reduced corrosivity to metal with which it comes in contact.

Aqueous HCl or hydrochloric acid compositions employed in industrial operations frequently attack metals with which they are in contact during storage, use, or transfer, thereby both lessening the life of the metal and contaminating the HCl composition. Hydrochloric acid compositions are widely used, e.g., as reactants in chemical operations, as solvents and liquid carriers for other reactants requiring an acidic medium, for cleaning and descaling vessels and lines, and for dissolving $CaCO_3$-containing subterranean formations to increase the porosity thereof as in limestone oil-bearing formations. Treatment of oil-bearing formations with an acid is known in the petroleum producing art as "acidizing." The steps are well known, e.g., a description thereof is set out in U.S. Patent 1,877,504.

Attempts have been made to lessen the corrosivity on metal of aqueous solutions containing HCl without seriously impairing the activity of the acidic composition for the purpose intended, particularly for the removal of scale on the interior of a metal vessel or dissolving limestone in an oil-bearing formation to increase the productivity therefrom.

Such attempts have consisted largely of adding a relatively small percent of a substance to the aqueous HCl composition to inhibit the corrosivity of the composition. Among such substances are: Arsenates and arsenities, cyanides, organic sulfur compounds, alkyl ureas, and organic nitrogen compounds, e.g., aniline, phenyl-hydrazine, pyridine, quinoline, and acridine.

The employment of known additaments to aqueous HCl compositions has been of considerable value in alleviating the corrosive attack of such compositions, but corrosive attack of varying intensity persists during the use of such compositions containing known inhibitors and a need continues for more effective inhibition of corrosion by aqueous HCl compositions, especially in the art of descaling metal surfaces and acidizing subterranean formations.

The principal object of the invention is to satisfy such need. The ways by which this and related objects are attained is made clear in the ensuing description and is defined in the appended claims.

The invention is a method of rendering an aqueous HCl solution less corrosive to metals with which it comes in contact by admixing therewith (1) a fluorine compound having a water solubility such that the fluorine fraction or portion of such compound is dissolved to the extent of at least 0.15 gram per 100 grams of water at room temperature, and (2) an abietyl amine compound selected from the class consisting of (a) abietyl amine, (b) N-substituted abietyl amines, (c) salts of abietyl amine and of N-substituted abietyl amines having the general formula

wherein R is abietyl, hydroabietyl, or dehydroabietyl, wherein R' and R" are radicals independently selected from the group consisting of hydrogen and alkyl, alkaryl, and radicals having the structure

in which $n$ is an integer of from 2 to 6, and wherein Y is a halogen, and (d) a condensation product of abietyl amine and ethylene oxide.

The fluorine compound used in the practice of the invention is one having a solubility such that at least 0.15 gram of the fluorine portion thereof dissolves in 100 grams of water at room temperature. Among the fluorine compounds useful in the practice of the invention are alkali metal, ammonium, and alkaline earth fluorides and bifluorides and fluorine compounds yielding fluorine complex ions in water. Such compounds consist of (1) hydrogen, ammonium, an alkali metal or other positive metal such as zinc, (2) a transition element, e.g., titanium, phosphorus, aluminum, chromium, boron, or silicon, and (3) fluorine. The complex fluorine compounds are preferred where the HCl solution is to be used for a protracted period of time. Among such fluorine compounds yielding a complex ion are $H_2TiF_6$, $K_3CrF_6$, $HBF_4$, $NaAlF_4$, $H_2SiF_6$, $NH_4PF_6$ and

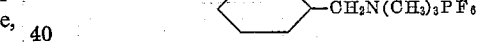

The amount of the fluorine compound to employ varies with the solubility. Broadly the amount of the fluorine compound to add is between 0.05 and 2.0 weight percent and the preferred amount is between 0.1 and 1.0 weight percent based on the weight of the aqueous HCl solution.

Likewise, abietyl amine or a derivative thereof, is also employed in an amount between 0.05 and 2.0 percent but usually between 0.10 and 1.0 percent by weight of the aqueous HCl solution. The rosin amines described in U.S. Patent 2,758,970 are satisfactory for use in the practice of the invention. The preferred abietyl amine compound to employ is either abietyl amine or a soluble chloride salt of an N-substituted abietyl amine, e.g., bis(3-keto-3-phenylalkyl) abietyl amine, wherein the alkyl groups may be methyl, ethyl, propyl, or butyl.

It is preferred that a surfactant in an amount between 0.05 to 1.0 weight percent, but preferably about 0.1 weight percent, be admixed with the aqueous mixture of HCl, abietyl amine compound, and fluorine-containing compound. Any surfactant, soluble in the acidic solution and which lowers the surface tension thereof appreciably, is suitable for the practice of the invention. Examples of such surfactants are the following:

(1) Anionic type, e.g., ammonium isopropyl benzene parasulfonate;
(2) Nonionic type, e.g., the condensation product of nonylphenol and either ethylene oxide or diethanolamide of coconut oil fatty acids;
(3) Cationic type, e.g., a di-fatty alkyl quaternary ammonium chloride as represented by

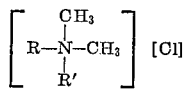

where R and R' are alkyl radicals of from 8 to 18 carbon atoms.

Test runs were made on metal coupons wherein each was treated either according to the practice of the invention or, for comparative purposes, either in an aqueous HCl solution alone or in an aqueous HCl solution which contained either the fluorine compound or the abietyl amine compound but not both. The test runs which are illustrative of the invention are designated examples and those which are not according to the invention are designated comparative tests.

The coupons were prepared as follows: 1" long rings were cut from a 2" inside diameter pipe composed of a steel designated A.P.I. N80. The thickness of the metal in the pipe was 0.375". The rings were then cut axially to form four segments of each ring and the segments weighed. One of such segments constituted the coupon used in each of the examples and comparative tests.

The comparative tests were made as follows: one of the above prepared coupons was placed in a 15 percent by weight solution of HCl alone or in such HCl solution containing fluorine compound in the amount set out in Table I below. The solution was held at 200° F. and the coupon retained therein for 16 hours. The coupons were then removed, rinsed, dried, and weighed, and the corrosion rate calculated from the weight loss. The corrosion rate in pounds per square foot per day is set out in Table I.

*Table I*

| Comparative Test No. | Percent by weight of fluorine compound added to 15 percent HCl | Corrosion rate in lb./ft.²/day |
|---|---|---|
| 1 | None | 0.92 |
| 2 | 0.5 hexafluorotitanic acid (as a 60 percent solution in water) | 0.90 |
| 3 | 1.0 hexafluorotitanic acid (as a 60 percent solution in water) | 0.88 |
| 4 | 1.0 ammonium hexafluorotitanate | 0.93 |
| 5 | 1.0 cryolite | 0.92 |
| 6 | 1.0 hexafluorosilicic acid (as a 30 percent solution in water) | 0.96 |
| 7 | 1.0 ammonium bifluoride | 0.94 |

Reference to Table I readily shows that the presence of the various fluorine compounds employed therein had no effect on the rate of corrosion of the metal segments by contact with the aqueous HCl solution.

To show the effectiveness in lessening the corrosivity of an aqueous HCl solution on metal by the practice of the invention in contrast to the corrosivity when no inhibitor is used or the fluorine compound is used alone the following examples of the invention were run:

An aqueous HCl composition of the invention was prepared as follows: To a 15 percent by weight aqueous solution of HCl were admixed 0.2 percent of the chloride salt of bis(3-keto-3-phenylpropyl) abietyl amine, 0.1 percent of the polyglycol prepared by condensing 1 mole of di-sec-butylphenol per 15 moles of ethylene oxide, and the percent of the fluorine compound set out in Table II below.

One of the weighed coupons (metal pipe segments) prepared above was placed in each of the solutions so prepared above which had been prepared for use according to the invention as stated above and set out in Table II, and retained therein at that temperature for 16 hours as in the tests shown in Table I. The fluorine compound was added in 100 percent strength except where a less percentage is set out. The metal coupon thus treated was then removed, water-rinsed, dried, and weighed. The corrosion rate in pounds per square foot per day was calculated from the weight loss and is set out in Table II which follows:

*Table II*

| Example No. | Concentration of fluorine compound in 15% HCl solution containing the abietyl amine derivative | Corrosion rate (lb./ft.²/day) |
|---|---|---|
| 1 | 0.5 percent hexafluorotitanic acid, (60 per cent in water). | 0.12 |
| 2 | ----do---- | 0.045 |
| 3 | 0.4 percent hexafluorotitanic acid, (60 percent in water). | 0.12 |
| 4 | 1.0 percent hexafluorotitanic acid, (60 percent in water). | 0.19 |
| 5 | 0.5 percent potassium hexafluorochromate | 0.093 |
| 6 | 0.5 percent hexafluorophosphoric acid | 0.13 |
| 7 | 1.0 percent hexafluorophosphoric acid | 0.10 |
| 8 | 0.5 percent ammonium hexafluorotitanate | 0.19 |
| 9 | 1.0 percent ammonium hexafluorotitanate | 0.18 |
| 10 | 0.5 percent potassium hexafluorotitanate | 0.20 |
| 11 | 1.0 percent potassium hexafluorotitanate | 0.23 |
| 12 | 0.5 percent potassium tetrafluoroborate | 0.22 |
| 13 | 0.3 percent Cryolite (3NaF·AlF₃) | 0.33 |
| 14 | 0.5 percent Cryolite (3NaF·AlF₃) | 0.30 |
| 15 | 1.0 percent Cryolite (3NaF·AlF₃) | 0.11 |
| 16 | 0.25 percent hexafluorosilicic acid (30 percent in water). | 0.54 |
| 17 | 0.5 percent hexafluorosilicic acid | 0.44 |
| 18 | 0.75 percent hexafluorosilicic acid | 0.32 |
| 19 | 1.0 percent hexafluorosilicic acid | 0.34 |
| 20 | 0.5 percent zinc hexafluorosilicate | 0.25 |
| 21 | 1.0 percent zinc hexafluorosilicate | 0.27 |
| 22 | 0.5 percent potassium hexafluorosilicate | 0.22 |
| 23 | 0.5 percent monoethyl tri-n-butyl ammonium hexafluorophosphate. | 0.18 |
| 24 | 0.5 percent benzyltrimethyl ammonium hexafluorophosphate. | 0.32 |
| 25 | 0.5 percent pyridinium hexafluorophosphate | 0.23 |
| 26 | 0.5 percent potassium fluoride | 0.21 |
| 27 | 0.5 percent magnesium fluoride | 0.24 |
| 28 | 1.0 percent magnesium fluoride | 0.02 |
| 29 | 0.5 percent chromium trifluoride | 0.29 |
| 30 | 0.5 percent potassium bifluoride | 0.30 |
| 31 | 1.6 percent potassium bifluoride | 0.047 |
| 32 | 0.5 percent ammonium bifluoride | 0.059 |
| 33 | 0.5 percent ammonium hexafluorophosphate fluoride. | 0.15 |

An examination of Table II shows that the presence of both a water-soluble fluorine compound and a water-soluble N-substituted abietyl amine chloride when admixed with an aqueous solution of HCl acid markedly reduces the corrosivity of the HCl solution on ferrous metals.

To show the synergistic effect of employing both a soluble fluorine compound and a substituted abietyl amine, to lessen corrosivity of an aqueous HCl solution in accordance with the practice of the invention in contrast to employing an N-substituted abietyl amine salt alone for purposes of comparison, the following examples and comparative tests were run.

To a 15 percent by weight aqueous solution of HCl was admixed 0.4 percent by weight of abietyl amine to the condensation product of abietyl amine and ethylene oxide in the amount set out in Table III. The HCl solution thus admixed with abietyl amine or the condensation product was divided into four equal portions. Two of said equal portions were employed as such as are designated comparative tests 8 and 9 in Table III. To the other two equal portions were admixed 0.5 percent by weight of hexafluorotitanic acid (dissolved in a 60 percent by weight aqueous solution). These portions are designated Examples 34 and 35 in Table III and are illustrative of the practice of the invention. Segments of the 2" pipe coupons composed of API N80 metal of the type employed in the above examples and tests were weighed and placed in the separate HCl solutions and held at 175° F. for 16 hours.

After the 16 hour period, the coupons were removed, water-rinsed, dried, weighed, and the corrosion rate calculated as in the tests and examples above. The corrosion rate in pounds per day is set out in Table III.

Table III

| Run No. | Concentration of Abietyl Amine Compound Used | Concentration Hexafluorotitanic Acid in Weight Percent | Corrosion Rate (lb./ft.²/day) |
|---|---|---|---|
| Comparative Test 8. | 0.4 abietyl amine | None | 0.78 |
| Comparative Test 9. | 0.4 condensation product prepared by condensing eleven moles ethylene oxide per mole of abietyl amine. | None | 0.91 |
| Example 34 | 0.4 abietyl amine | 0.5 | 0.25 |
| Example 35 | 0.4 condensation product prepared by condensing eleven moles ethylene oxide per mole of abietyl amine. | 0.5 | 0.36 |

An examination of the results of Table III shows that when abietyl amine or the condensation product of abietyl amine and ethylene oxide alone was employed, the corrosivity of the HCl solution was only slightly inhibited whereas the presence of both the abietyl amine compound and the hexafluorotitanic acid together had a pronounced inhibiting effect on the corrosivity of the HCl solution. Since the fluorine compound employed alone shows no inhibition of corrosion such improvement is clearly due to the combined effect of the two additaments not predictable from the effect of either one alone.

To show the relative inefficiency of an N-substituted abietyl amine alone on different ferrous alloys, in contrast to the synergistic effect of the same N-substituted abietyl amine and a soluble fluorine compound according to the invention, the following comparative tests and examples of the invention were run employing 2¾ inch ferrous metal panels of the type and thickness set out in Table IV below. The procedure for the test was as follow: To a 15 percent by weight aqueous solution of HCl were admixed 0.2 percent of the chloride salt of bis(3-keto-3-phenylpropyl)abietyl amine, and 0.1 percent of the polyglycol surfactant employed in the examples of Tables I and II. The HCl solution thus treated with the N-substituted abietyl amine was divided into 8 equal sized portions. Four of the portions were not further treated and are designated comparative tests 10 to 13 of Table IV. To the other portions were admixed 0.5 percent by weight hexafluorotitanic acid and are designated Examples 36 to 48 in Table IV. The panels were placed in the treating solution at the temperature shown in Table IV and kept therein for 16 hours. The corrosion rate in pounds per square foot per day is set out in the table.

Table IV

| Run No. | Concentration in weight percent of hexafluorotitanic acid (added as a 60 percent solution in water) | Metal tested | Temp. of test solution in (° F.) | Corrosion rate (lb./ft.²/day) |
|---|---|---|---|---|
| Comparative Test 10. | None | Cast iron, ½" thick. | 150 | 0.89 |
| Comparative Test 11. | None | AISI 1010,¹ ⅛" thick. | 175 | 0.071 |
| Comparative Test 12. | None | AISI 304,¹ ⅛" thick. | 175 | 0.0035 |
| Comparative Test 13. | None | Admiralty,² ⅟₁₆" thick. | 175 | 0.018 |
| Example 36 | 0.5 | Cast iron, ½" thick. | 150 | 0.62 |
| Example 37 | 0.5 | AISI 1010,¹ ⅛" thick. | 175 | 0.019 |
| Example 38 | 0.5 | AISI 304,¹ ⅛" thick. | 175 | 0.0019 |
| Example 39 | 0.5 | Admiralty,² ⅟₁₆" thick. | 175 | 0.011 |

¹ ASTM designations.
² Admiralty metal is a copper alloy seamless condenser tube stock described in ASTM Bulletin 52.

An examination of the results of Table IV shows that the abietyl amine derivative employed alone had very little inhibiting effect on the corrosivity of the HCl solution compared to the inhibiting effect of the same abietyl amine derivative when employed with the fluorine compound shown, in accordance with the invention.

Other tests were run employing 0.5 weight percent of hexafluorotitanic acid as a 60 percent aqueous solution with either 0.4 or 0.5 percent of other known inhibitors to metal corrosion by HCl solutions. Among the inhibitors thus employed with hexafluorotitanic acid without any manifestation of any beneficial effect on lessening corrosivity of HCl were dibutylthiourea, ethynylcyclohexyl derivatives, propargyl alcohol derivatives, and arsenic compounds. No synergism occurred, i.e., no effect was produced which was not predictable from a knowledge of the properties of each employed singly.

Tests were also run on various ferrous metal specimens to determine the inhibiting effect, if any, of the composition of the invention on aqueous solutions of such acids as acetic, citric, phosphoric, sulfamic, and sulfuric. The tests were run by adding to various strengths of such acids, the following mixture which typifies the additaments employed in HCl solutions in the practice of the invention: 0.5 percent by weight of the chloride salt of bis(3-keto-3-phenylpropyl)abietyl amine, 0.1 percent of the polyglycol employed above, and 0.5 percent of hexafluorotitanic acid in a 60 percent aqueous solution. No synergistic effect on lessening the corrosion by such acids occurs. Only aqueous solutions of HCl have the corrosivity thereof appreciably lessened by the practice of the invention.

To illustrate the practice of the invention, i.e., to lessen the corrosivity of an aqueous HCl solution, e.g., to use for descaling ferrous lines and vessels, or to acidize an oil- or gas-producing formation, wherein ferrous tubing, casing and transfer lines are encountered, a 1000 gallon batch of inhibited hydrochloric acid may be prepared as follows:

561 gallons of water are placed in a 1000 gallon mixing tank. To the water are admixed about 0.1 percent by weight of the chloride salt of bis(3-keto-3-phenylpropyl) abietyl amine (usually previously diluted with a small percent of water to impart added fluidity thereto for convenient transfer), about 1 gallon of a surfactant, e.g., the polyglycol formed by condensing 1 mole di-sec-butylphenol per 15 moles of ethylene oxide, and 5 gallons of a 60 percent aqueous solution of hexafluorotitanic acid. Mixing is carried on for about 15 minutes to make a homogeneous solution and thereafter 430 gallons of 32 percent by weight hydrochloric acid is admixed with the aqueous solution and mixing continued for a time until the acid is well mixed. The HCl solution is thereby made markedly less corrosive and the solution thus made has wide application for such uses as metal cleaning and oil well treatment.

Having described the invention, what is claimed and desired to be protected by Letters Patent is:

1. An aqueous acidic solution for contacting ferrous metal which consists by weight of from 5 to 25 percent HCl and from 0.05 to 2.0 percent each of (1) a water soluble organic amine compound selected from the class consisting of abietyl amine and water-soluble salts thereof, N-aliphatic and N-keto-aliphatic substituted abietyl amine and water-soluble salts thereof, and condensation products of abietyl amine and ethylene oxide having the general formula

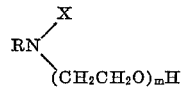

where R is a radical selected from the group consisting of abietyl, hydroabietyl, and dehydroabietyl, X is a radical selected from the group consisting of H and

and $m$ and $n$ are integers between 2 and 10, the sum thereof being between 4 and 20 and (2) a fluorine compound having a solubility such that at least 0.15 gram of the fluorine portion thereof dissolves in 100 grams of water at room temperature selected from the group consisting of hexafluorotitanic acid, hexafluorosilicic acid, hexafluorophosphoric acid, fluoroboric acid, hexafluoroalumanic acid, fluorosulfonic acid, soluble salts and acid salts of any of said acids, water-soluble salts and acid salts of hydrofluoric acid and mixtures of said acids and said salts.

2. The aqueous acidic solution of claim 1, wherein the organic amine compound and the fluorine compound are each present in an amount between 0.1 and 1.0 percent by weight of said solution.

3. The aqueous acidic solution of claim 1 which contains between 0.1 and 1.0 percent of a surface active agent.

4. A method of inhibiting the corrosivity of a confined aqueous HCl solution on the metal walls of conducting and storage vessels employed to confine said HCl solution consisting of maintaining, dissolved in said solution, the composition comprising between 0.05 and 2.0 percent each, based on the weight of said HCl solution of (1) a water-soluble organic amine compound selected from the class consisting of abietyl amine and water soluble salts thereof, N-aliphatic and N-keto aliphatic substituted abietyl amine and water-soluble salts thereof, and condensation products of abietyl amine and ethylene oxide having the general formula

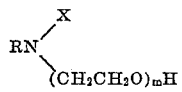

where R is a radical selected from the group consisting of abietyl, hydroabietyl, and dehydroabietyl, X is a radical selected from the group consisting of H and

and $m$ and $n$ are integers between 2 and 10, the sum thereof being between 4 and 20 and (2) a fluorine compound having a solubility such that at least 0.15 gram of the fluorine portion thereof dissolves in 100 grams of water at room temperature selected from the group consisting of hexafluorotitanic acid, hexafluorosilicic acid, hexafluorophosphoric acid, fluoroboric acid, hexafluoroalumanic acid, fluorosulfonic acid, soluble salts and acid salts of any of said acids, and water-soluble salts and acid salts of hydrofluoric acid, and mixtures of said acids and said salts.

5. The method of claim 4 which includes the step of admixing between 0.1 and 1.0 percent by weight of a surface active agent with said HCl solution.

6. The method of claim 4 wherein the soluble fluorine compound is hexafluorotitanic acid.

7. The method of claim 4 wherein the amount of each of the organic amine compound and the fluorine compound is between 0.1 and 1.0 percent based on the weight of the aqueous HCl solution.

8. The method of claim 7 wherein the water-soluble salt of an N-substituted abietyl amine has the general formula:

wherein R is the abietyl group, R' and R" are groups independently selected from the class consisting of alkyl, alkaryl, and keto-alkyl, and Y is a halide.

9. The method of claim 8 wherein the N-substituted abietyl amine salt is the chloride of bis(3-keto-3-phenylpropyl)abietyl amine.

References Cited in the file of this patent
UNITED STATES PATENTS

| | | |
|---|---|---|
| 1,877,504 | Grebe et al. | Sept. 13, 1932 |
| 2,011,579 | Heath et al. | Aug. 20, 1935 |
| 2,225,695 | Henderson et al. | Dec. 24, 1940 |
| 2,300,393 | Ayers | Nov. 3, 1942 |
| 2,510,063 | Bried | June 6, 1950 |
| 2,559,754 | Bittles et al. | July 10, 1951 |
| 2,664,398 | Bond | Dec. 29, 1953 |
| 2,732,398 | Brice et al. | Jan. 24, 1956 |
| 2,758,970 | Saukaitis et al. | Aug. 14, 1956 |
| 2,799,659 | Mayhew et al. | July 16, 1957 |
| 2,825,697 | Carroll et al. | Mar. 4, 1958 |